United States Patent
Lin (10) Patent No.: US 9,578,119 B2
(45) Date of Patent: Feb. 21, 2017

(54) METHOD, SERVER, AND CLIENT FOR PUSHING AND DISPLAYING SPLASH SCREEN

(71) Applicant: TENCENT TECHNOLOGY (SHENZHEN) COMPANY LIMITED, Shenzhen (CN)

(72) Inventor: Xiaodan Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 283 days.

(21) Appl. No.: 14/091,370

(22) Filed: Nov. 27, 2013

(65) Prior Publication Data
US 2014/0089397 A1    Mar. 27, 2014

Related U.S. Application Data

(63) Continuation of application No. PCT/CN2013/079878, filed on Aug. 23, 2013.

(30) Foreign Application Priority Data

Jul. 27, 2012  (CN) .......................... 2012 1 0263958

(51) Int. Cl.
G06F 15/16      (2006.01)
H04L 29/08      (2006.01)

(52) U.S. Cl.
CPC .............. H04L 67/26 (2013.01); H04L 67/22 (2013.01); H04L 67/306 (2013.01); H04L 67/36 (2013.01)

(58) Field of Classification Search
CPC ........ H04L 67/22; H04L 67/26; H04L 67/306; H04L 67/36; G06F 3/1204
(Continued)

(56) References Cited

U.S. PATENT DOCUMENTS 9,043,412 B2 *   5/2015   Chen ....................... H04L 67/10
                                                                709/206
2004/0100479 A1 *  5/2004   Nakano ................. G06F 1/1626
                                                                715/700
(Continued)

FOREIGN PATENT DOCUMENTS

CN      1433542 A        7/2003
FR      2897500 A1       8/2007
WO      2011067611 A2    6/2011

OTHER PUBLICATIONS

The World Intellectual Property Organization (WIPO) International Search Report for PCT/CN2013/079878 Oct. 31, 2013.
(Continued)

Primary Examiner — Tesfay Yohannes
(74) Attorney, Agent, or Firm — Anova Law Group, PLLC (57) ABSTRACT

Methods, servers, and clients for pushing and/or displaying a splash screen are provided herein. In an exemplary embodiment, a server can receive identification information sent from a client. The identification information can include user identification, a globally unique identifier (GUID) of the client, or a combination thereof. The server can obtain feature information correlated with the identification information from a preset database. The server can configure a splash screen according to the feature information and send the splash screen to the client. The splash screen can be displayed next time when the client is opened up.

16 Claims, 4 Drawing Sheets

(58) Field of Classification Search
USPC .................. 709/203, 219; 358/1.13, 113
See application file for complete search history.

(56) References Cited

U.S. PATENT DOCUMENTS

| | | | | |
|---|---|---|---|---|
| 2004/0228503 | A1* | 11/2004 | Cutler | G06K 9/00348 |
| | | | | 382/103 |
| 2005/0131944 | A1 | 6/2005 | Patrick et al. | |
| 2007/0286381 | A1* | 12/2007 | Abramson | H04M 1/2471 |
| | | | | 379/201.01 |
| 2012/0099127 | A1* | 4/2012 | Nagata | G06F 3/1204 |
| | | | | 358/1.13 |
| 2012/0239607 | A1* | 9/2012 | Rao | G06Q 30/02 |
| | | | | 706/58 |
| 2012/0296908 | A1* | 11/2012 | Bach | G06F 17/30743 |
| | | | | 707/737 |
| 2013/0159408 | A1* | 6/2013 | Winn | G06N 99/005 |
| | | | | 709/204 |
| 2013/0246585 | A1* | 9/2013 | Zeng | G06F 9/445 |
| | | | | 709/219 |
| 2014/0064557 | A1* | 3/2014 | Hara | G06F 3/017 |
| | | | | 382/103 |
| 2014/0377727 | A1* | 12/2014 | Yom-Tov | A61B 5/165 |
| | | | | 434/236 |

OTHER PUBLICATIONS

The State Intellectual Property Office of the People's Republic of China (SIPO) Office Action 1 for 201210263958.0 Feb. 15, 2015.

\* cited by examiner

The server obtains user behavior data of a client

S302

The server extracts feature information from the user behavior data

S303

The server correlates the feature information with GUID of the client and stores the feature information in the preset database

FIG. 3

The Sagittarian, being liberal, QQ browser wishes you a Happy birthday!

FIG. 4A

QQ browser wishes all Sagittarians a Happy birthday!

METHOD, SERVER, AND CLIENT FOR PUSHING AND DISPLAYING SPLASH SCREEN

CROSS-REFERENCES TO RELATED APPLICATIONS

This application is a continuation application of PCT Patent Application No. PCT/CN2013/079878, filed on Aug. 23, 2013, which claims priority to Chinese Patent Application No. CN201210263958.0, filed on Jul. 27, 2012, the entire contents of all of which are incorporated herein by reference.

FIELD OF THE DISCLOSURE

The present disclosure relates to the field of Internet technology and, more particularly, relates to methods, servers, and clients for pushing and/or displaying a splash screen.

BACKGROUND

A splash screen may be an image appeared on a screen of a client when a user opens up an application program of the client. A splash screen usually displays information including name and/or version of the application program, advertisement, and/or greetings.

Conventionally, the content of a splash screen is targeted to all users. That is, the content of the splash screen seen by all users is the same, and cannot be customized or personalized for each user based on their own characteristics and situations.

It is therefore desirable to provide methods, servers, and clients for pushing and displaying a splash screen as desired.

BRIEF SUMMARY OF THE DISCLOSURE

According to various embodiments, there is provided a method for pushing a splash screen. A server can receive identification information sent from a client. The identification information can include user identification, a globally unique identifier (GUID) of the client, or a combination thereof. The server can obtain feature information correlated with the identification information from a preset database. The server can configure a splash screen according to the feature information and send the splash screen to the client. The splash screen can be displayed next time when the client is opened up.

According to various embodiments, there is provided another method for displaying a splash screen. A client can send identification information to a server. The identification information can include user identification, a GUID of the client, or a combination thereof. The identification information can be used by the server to obtain feature information correlated with the identification information from a preset database. The identification information can receive a splash screen configured by the server according to the feature information. The identification information can display the splash screen next time when the client is opened up.

According to various embodiments, there is provided a server. The server can include a first receiving module, a first obtaining module, and a configuring module. The first receiving module can be configured to receive identification information sent from a client. The identification information can include user identification, a GUID of the client, or a combination thereof. The first obtaining module can be configured to obtain feature information correlated with the identification information from a preset database. The configuring module can be configured to configure a splash screen according to the feature information and to send the splash screen to the client. The splash screen can be displayed on a screen of the client next time when the client is opened up.

According to various embodiments, there is provided a client. The client can include a sending module, a second receiving module, and/or a displaying module. The sending module can be configured to send identification information to a server. The identification information can include user identification or a GUID of the client, or a combination thereof. The identification information can be used by the server to obtain feature information correlated with the identification information from a preset database. The second receiving module can be configured to receive a splash screen configured by the server according to the feature information. The displaying module can be configured to display the splash screen next time when the client is opened up.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

According to various disclosed embodiments, a server can configure a splash screen for displaying on a client based on relevant feature information of a user who uses the client. The splash screen can be displayed next time when the client is opened (or started) up. The displayed content of the splash screen can be customized and/or personalized and can match the personality and/or situations of the user. Thus, use experience of the product can be improved.

FIGS. 1-6 depict exemplary methods, servers, and clients for pushing and/or displaying a splash screen in accordance with various disclosed embodiments. The exemplary methods, servers, and clients can be implemented, for example, in an exemplary environment 700 as shown in FIG. 7.

Figure 7:
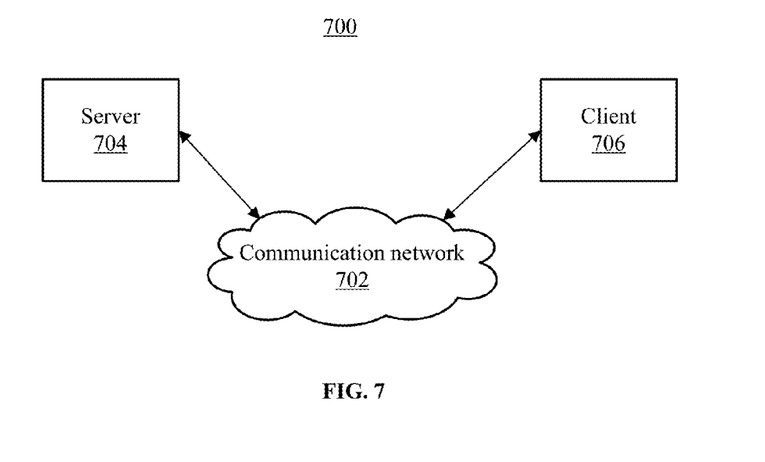
FIG. 7 depicts an exemplary environment incorporating certain disclosed embodiments.

Referring to FIG. 7, the exemplary environment 700 may include a server 704, a client 706, and a communication network 702. The server 704 and the client 706 may be coupled through the communication network 702 for information exchange, such as sending/receiving identification information, sending/receiving data files such as splash screen images, etc. Although only one client 706 and one server 704 is shown in the environment 700, any number of terminals 706 or servers 704 may be included, and other devices may also be included.

The communication network 702 may include any appropriate type of communication network for providing network connections to the server 704 and client 706 or among multiple servers 704 or clients 706. For example, communication network 702 may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client can be stationary or mobile.

A server, as used herein, may refer to one or more server computers configured to provide certain server functionalities, such as database management and search engines. A server may also include one or more processors to execute computer programs in parallel.

Figure 8:
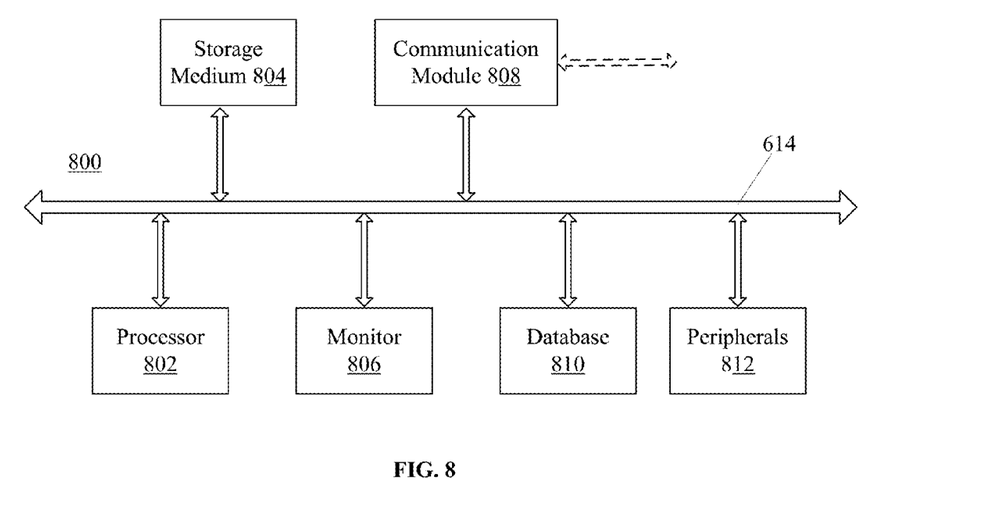
FIG. 8 depicts an exemplary system for a server and/or a client consistent with the disclosed embodiments.

FIG. 8 shows a block diagram of an exemplary computing system for a server and/or a client. As shown in FIG. 8, the exemplary system 800 may include a processor 802, a storage medium 804, a monitor 806, a communication module 808, a database 810, peripherals 812, and one or more bus 814 to couple the devices together. Certain devices may be omitted and other devices may be included.

The processor 802 may include any appropriate processor or processors. Further, processor 802 can include multiple cores for multi-thread or parallel processing. Storage medium 804 may include memory modules, such as ROM, RAM, and flash memory modules, and mass storages, such as CD-ROM, U-disk, removable hard disk, etc. Storage medium 804 may store computer programs for implementing various processes, when executed by processor 802.

Further, the monitor 806 may include display devices for displaying certain user interface contents such as splash screens. Peripherals 812 may include I/O devices such as keyboard and mouse, and communication module 808 may include network devices for establishing connections through the communication network 702. Database 810 may include one or more databases for storing certain data and for performing certain operations on the stored data, such as database management, data extraction/analysis.

In operation, referring to FIG. 7, client 706 may cause server 704 to perform certain actions, such as receiving identification information, configuring a splash screen, or other operations. The server 704 may be configured to provide structures and functions for such actions and operations. For example, the server 704 may include a splash screen configuration system for configuring splash screens based on identification information of user(s) sent by the client 706.

Figure 1:
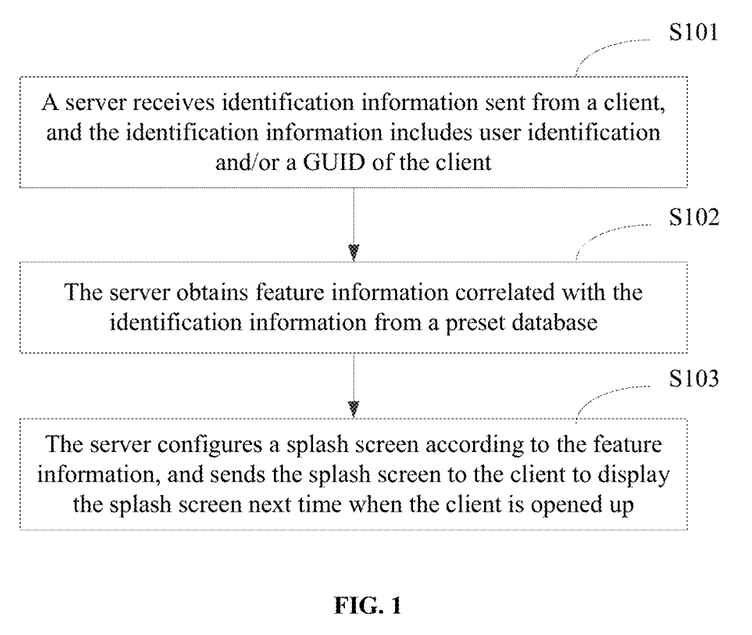
FIG. 1 depicts a flow diagram of an exemplary method for pushing a splash screen in accordance with various disclosed embodiments.

FIG. 1 depicts a flow diagram of an exemplary method for pushing a splash screen in accordance with various disclosed embodiments. In one embodiment, the exemplary embodiment can be executed by a server.

Referring to FIG. 1, in Step S101, a server receives identification information sent from a client. The identification information can include user identification and/or a globally unique identifier (GUID) of the client.

In an embodiment where the identification information includes user identification, the client can obtain login information generated when a user uses the client. The login information can include the user identification. The user identification can be used to uniquely identify the user of the client. The user identification can include, but is not limited to, information including, for example, a user login name, a user name, an email address, a mobile phone number, etc. When a user performs a login activity on the client, the client can simultaneously obtain the user's login information to extract the user identification and send the user identification to the server.

In one embodiment, the login activity of the user can include a login activity of the user on the client, and/or a login activity of the user when browsing a page for a certain business (e.g., including a service) of the client. For example, the user can visit a web page for a certain business using a browser of the client and then log in via the web page.

In another embodiment, the identification information can include the GUID of the client. A client running on each host computer can have a unique GUID. The unique GUID can be used to distinguish clients from one another. Thus, the GUID of the client can be sent to the server so the server can obtain a unique identification of the client.

In Step S102, the server obtains feature information correlated with the obtained identification information from a preset database.

In one embodiment, the preset database of the server can store the feature information gathered statistically according to relevant network behaviors of the user during previous usage of the client. The preset database of the server can also store the feature information gathered statistically according to relevant network behaviors of all users of the client during previous usage of the client. The feature information can be correlated with the corresponding identification information. Therefore, after receiving the identification information sent from the client, the server can obtain the feature information correlated with the identification information from the preset database.

Figure 2:
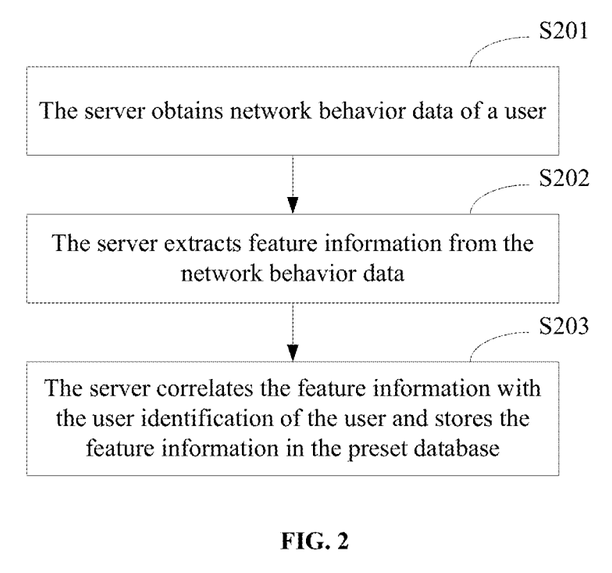
FIG. 2 depicts a flow diagram of another exemplary method for pushing a splash screen in accordance with various disclosed embodiments.

In one embodiment, the identification information can include the user identification. The feature information can be established in the preset database prior to Step S101 of FIG. 1, which is depicted in FIG. 2.

In Step S201, the server obtains network behavior data of the user.

In one embodiment, the network behavior data can be network behavior data generated when the user uses the client to access the Internet. The network behavior data can include: the user's basic personal information including, for example, name, age, gender, occupation, school, etc.; the user's network virtual commmoduley attributes data including, for example, growth level, title, virtual job, role, etc.; and/or behavioral trace information left by the user's network activities. The server can obtain the network behavior data of the user in many ways.

For example, in one embodiment, the server can obtain the network behavior data of the user according to relevant registration information of the user. For example, when registering on the client, the user may submit relevant basic personal information or behavioral information such as hobbies, leisure activities, etc. Thus, the server can obtain the network behavior data of the user when the user registers on the client.

In another embodiment, the server can obtain corresponding network behavior data during processes of the user's daily network behaviors. For example, the client can be a browser, and the user can log in via an account center of the browser. Next, the server can obtain the corresponding network behavior data through the user's browsing behaviors via the browser. For example, the user may browse a corresponding music website via the browser to listen to the music made by a singer that the user likes. The client can thus obtain network browsing trace of the user and send it to the server. Based on the network browsing trace sent by the client, the server can obtain the network behavior data such as the singer that the user likes, etc.

In Step S202, the server extracts feature information of the user from the network behavior data. In one embodiment, the server can analyze the obtained network behavior data using intelligent mining analysis or statistical analysis, from which the server can extract the user information (e.g., the feature information) that can describe the user's behavior characteristics or personal attributes including, but not limited to, information such as the user's birthday, zodiac sign, preferences, etc.

In Step S203, the server correlates the feature information with the user identification of the user and stores the feature information in the preset database.

In one embodiment, because the obtained network behavior data can be generated after the user logs in, the extracted user identification is essentially correlated with the user. Therefore, at the same time as the server obtains the network behavior data of the user in Step S201, the server can obtain the user identification of the user and can store the extracted feature information in the preset database after correlating the feature information with the user identification. With the increase of network behaviors of the user, the server can continuously accumulate corresponding feature information of the user, and can establish and store the feature information exclusively for the user according to the user identification. Thus, in Step S102 of FIG. 1, the server can obtain the feature information of the user from the preset database according to the user identification of the user.

Figure 3:
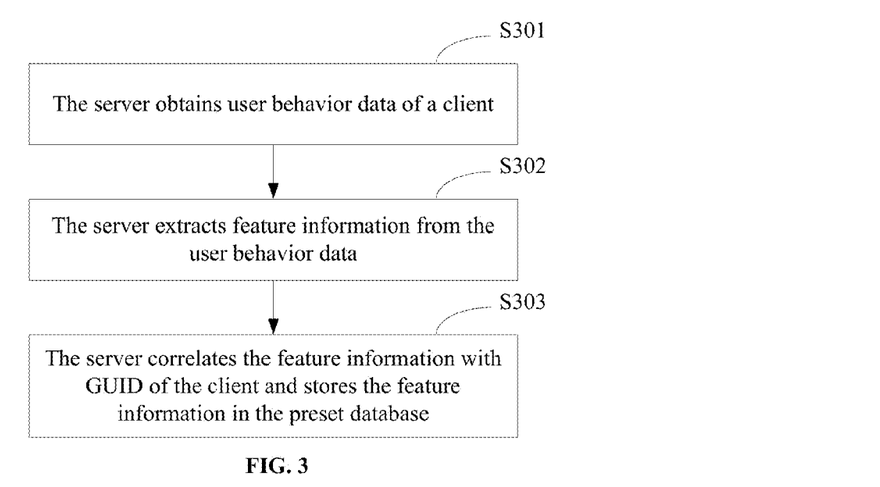
FIG. 3 depicts a flow diagram of another exemplary method for pushing a splash screen in accordance with various disclosed embodiments.
Figure 4A:
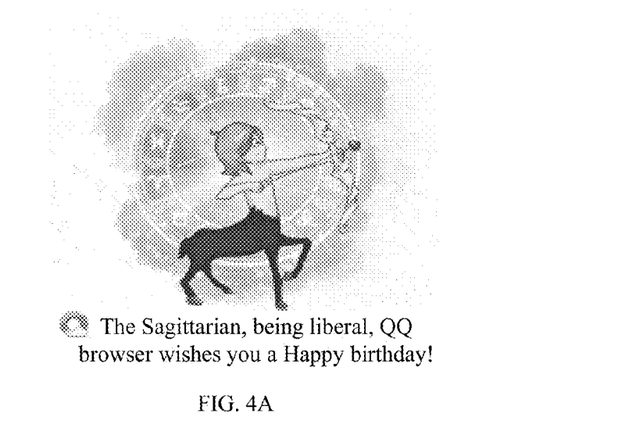
FIGS. 4A-4B depict exemplary splash screens of an exemplary method for pushing a splash screen in accordance with various disclosed embodiments.
Figure 4B:
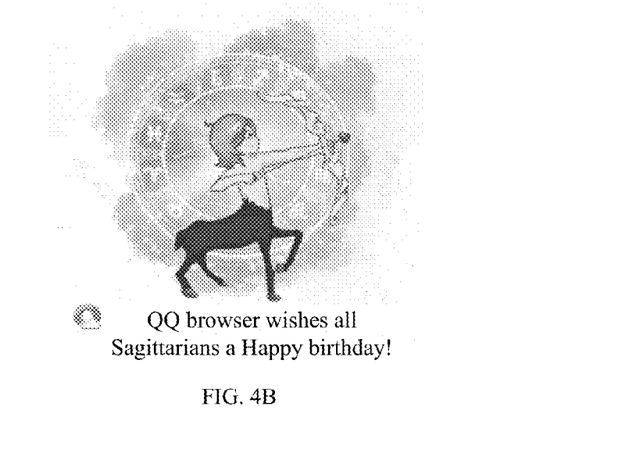

In another embodiment, for example, the identification information can include the GUID of the client. The feature information can be established in the preset database prior to Step S101 of FIG. 1, which is depicted in FIG. 3.

In Step S301, the server obtains user behavior data of the client.

In contrast with obtaining the network behavior data as described above in accordance with various embodiments (e.g., shown in FIG. 2), the user behavior data can be behavior data generated by all users of the client when they accessing the Internet via the client. The user behavior data can include behavioral trace information left from the users' network activities. For example, for a home computer and/or an office computer, most of the users thereof can be a specific user or a type of users having the same or similar behavior characteristics. Therefore, in such a situation, even if the user does not need to log in, the server can obtain the user behavior data of the users of the client through relevant records of browsing history sent by the client. The user behavior data can include behavior characteristics such as preferences of the users who frequently use the client.

In Step S302, the server extracts feature information from the user behavior data.

In one embodiment, the server can analyze the obtained user behavior data using intelligent mining analysis or statistical analysis, from which the server can extract user behavior characteristics (e.g., the feature information) that can describe the users of the client. The user behavior characteristics can include, but not limited to, information such as preferences of the user group of the client.

In Step S303, the server correlates the feature information with the GUID and stores the feature information in the preset database.

In one embodiment, the server can correlate the extracted feature information with the GUID and then store the feature information in the preset database. With the increase of network behaviors of the client, the server can continuously accumulate feature information of the user group of the client, and can establish and store the feature information exclusively for the client. Thus, in Step S102 of FIG. 1, the server can obtain the feature information of the user group of the client from the preset database according to the GUID of the client.

Referring back to FIG. 1, in Step S103, the server configures a splash screen according to the feature information and sends the splash screen to the client. The splash screen can be displayed next time when the client is opened up or started up.

In one embodiment, the server can configure a splash screen that can match with the feature information, based on the obtained feature information correlated with the identification information. For example, the feature information may indicate that the user's birthday is in the near future. The server can thus configure a corresponding splash screen with birthday wishes. For another example, the feature information may indicate that the user group of the client includes people younger than 28-year-old. The server can thus configure a corresponding splash screen of holiday wishes when the May 4 Youth Day comes. Thus, next time when the client is opened up, the user(s) can see a splash screen matching own personality traits and/or situations on the screen of the client. In this manner, product experience of the user(s) can be greatly enhanced.

In one embodiment, when the identification information includes the user identification, the client can add a login mode of the user to the identification information to send to the server, such that the server can push the splash screen more accurately by obtaining the login mode of the user. In one embodiment, the identification information sent to the server by the client can include the login mode of the user. For example, the client can be a browser, so the login mode of the user can be a direct login via the account center of the browser, or a login on a service page when the user browses the corresponding service page via the browser. Thus, the configuring of the splash screen according to user information (e.g., the feature information) can include the following.

When the login mode is a first mode, the server can configure a first splash screen according to the user information (e.g., the feature information); and when the login mode is a second mode, the server can configure a second splash screen according to the user information (e.g., the feature information).

In an example for pushing a splash screen having a zodiac sign, when the user logs in the client directly through an account center of the client, the server can configure the client with a zodiac sign splash screen for the individual user (e.g., shown in FIG. 4A), in order to send birthday wishes to the user.

When the user logs in the client through other service pages of the client, the server can configure the client with a zodiac sign splash screen having vaguely personalized message (e.g., shown in FIG. 4B), in order to prevent the user from feeling too abrupt. Thus the user's product experience can be further enhanced.

Figure 5:
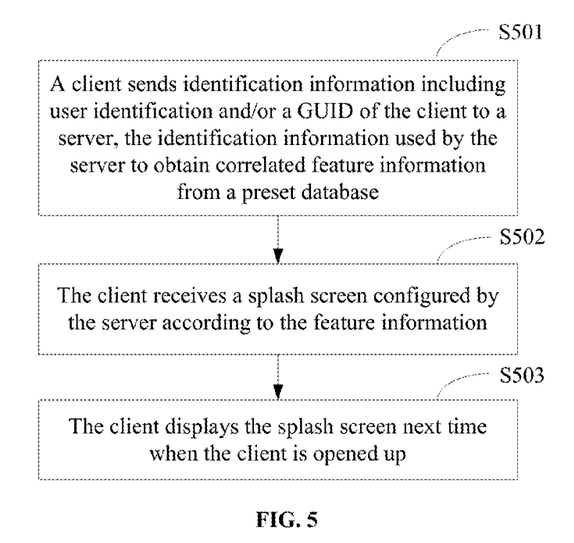
FIG. 5 depicts a flow diagram of an exemplary method for displaying a splash screen in accordance with various disclosed embodiments.

FIG. 5 depicts a flow diagram of an exemplary method for displaying a splash screen in accordance with various disclosed embodiments. In one embodiment, the exemplary method can be executed by a client.

In Step S501, a client sends identification information to a server. The identification information can include user identification or a GUID of the client. The identification information can be used to obtain feature information correlated with the identification information from a preset database. In one embodiment, the identification information may also include a login mode of a user, which can be obtained by the client when the user logs in.

In Step S502, the client receives a splash screen configured by the server according to the obtained feature information.

In Step S503, the client displays the splash screen next time when the client is opened up.

The operating principle for displaying the splash screen can be similar to or the same as the operating principle as depicted in the exemplary methods for pushing the splash screen according to various disclosed embodiments, e.g., as depicted in FIGS. 1-2.

Figure 6:
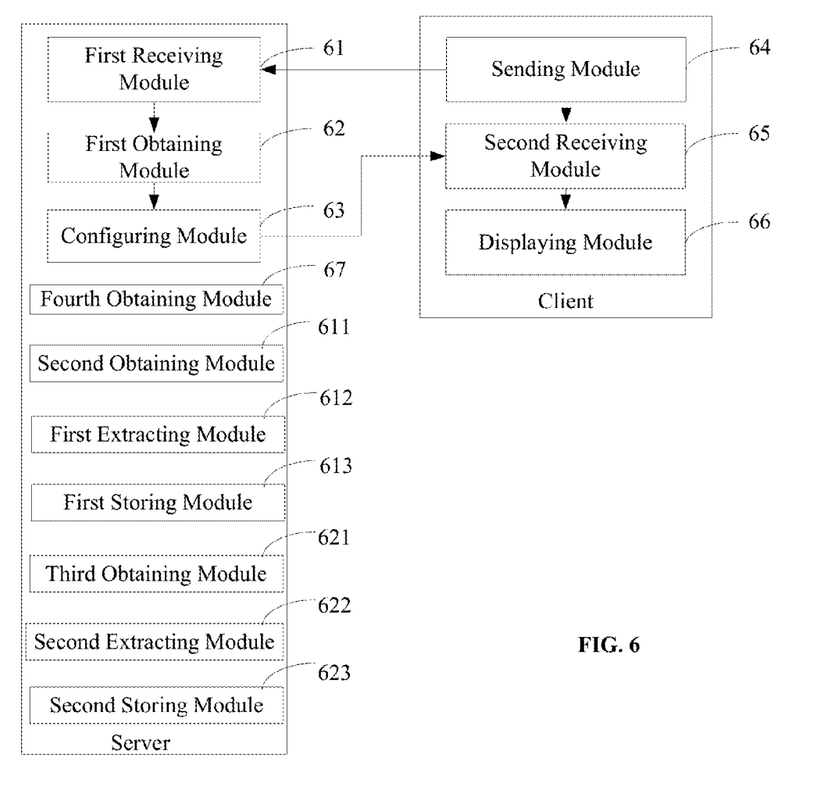
FIG. 6 depicts a structural diagram of an exemplary apparatus for displaying a splash screen in accordance with various disclosed embodiments.

FIG. 6 depicts a structure diagram of an exemplary apparatus for displaying a splash screen in accordance with various disclosed embodiments. The apparatus can be located at the server and the client to execute the method for pushing a splash screen and the method for displaying a splash screen, respectively, according to various disclosed embodiments, e.g., as depicted in FIGS. 1-5.

Referring to FIG. 6, at a server side, the exemplary apparatus can include a first receiving module 61, a first obtaining module 62, and/or a configuring module 63.

The first receiving module 61 is configured to receive identification information sent from a client. The identification information can include user identification or a GUID of the client.

The first obtaining module 62 is configured to obtain feature information correlated with the identification information from a preset database.

The configuring module 63 is used to configure a splash screen according to the feature information and to send the splash screen to the client. The splash screen can be displayed by the client next time when the client is opened up.

Further, when the identification information includes user identification, the server can include a second obtaining module 611, a first extracting module 612, and/or a first storing module 613.

The second obtaining module 611 is configured to obtain network behavior data of a user. The first extracting module 612 is configured to extract feature information from the network behavior data. The first storing module 613 is configured to correlate the feature information with the user identification of the user and to store the feature information in the preset database.

Further, the identification information can include a login mode of the user. The configuring module 63 can be specifically used to configure a first splash screen according to the feature information when the login mode is a first mode, and to configure a second splash screen according to the feature information when the login mode is a second mode.

In various embodiments, the identification information can include a GUID of the client. Thus, the server can further include a third obtaining module 621, a second extracting module 622, and/or a second storing module 623.

The third obtaining module 621 is configured to obtain user behavior data of the client. The second extracting module 622 is configured to extract feature information from the user behavior data. The second storing module 623 is configured to correlate the feature information with the GUID and to store the feature information in the preset database.

Referring back to FIG. 6, on the client side, the exemplary apparatus can include a sending module 64, a second receiving module 65, and/or a displaying module 66.

The sending module 64 is configured to send the identification information to the server. The identification information can include the user identification and/or the GUID of the client. The identification information can be used to obtain the feature information correlated with the identification information from the preset database.

The second receiving module 65 is configured to receive the splash screen configured by the server according to the feature information. The displaying module 66 is configured to display the splash screen next time when the client is opened up. Further, the identification information can include the user identification. Thus, the server can include a fourth obtaining module 67.

The fourth obtaining module 67 is configured to obtain login information of the user. The login information can include the user identification. Further, the identification information can include the login mode of the user.

According to various disclosed embodiments, a server can configure a corresponding splash screen appeared on a client based on relevant characteristics of user(s) of the client, such that the splash screen can be displayed next time when the client is opened up. Thus, personalized displaying of a splash screen contents can be realized, and product experience of the user(s) can be enhanced.

In certain embodiments, a preset database (e.g. a large backstage user profile system/database) and a splash screen configuration system at the server side can be used by the server to accumulate user data and user behavior, in order to push personalized splash screen to the client based on user profile. The splash screen can be shown at an opening of an application program (for example, as .jpeg or .gif images) as personalized messages for users.

In various embodiments, the disclosed modules can be configured in one device or configured in multiple devices as desired. The modules disclosed herein can be integrated in one module or in multiple modules. Each of the modules disclosed herein can be divided into one or more sub-modules, which can be recombined in any manner.

The disclosed embodiments can be examples only. One of ordinary skill in the art would appreciate that suitable software and/or hardware (e.g., a universal hardware platform) may be included and used in the disclosed methods and systems. For example, the disclosed embodiments can be implemented by hardware only, which alternatively can be implemented by software products only. The software products can be stored in a storage medium. The software products can include suitable commands to enable a terminal device (e.g., including a mobile phone, a personal computer, a server, or a network device, etc.) to implement the disclosed embodiments.

Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, servers, and clients for pushing and/or displaying a splash screen are provided herein. In an exemplary embodiment, a server can receive identification information sent from a client. The identification information can include user identification, a globally unique identifier (GUID) of the client, or a combination thereof. The server can obtain feature information correlated with the identification information from a preset database. The server can configure a splash screen according to the feature information and send the splash screen to the client. The splash screen can be displayed next time when the client is opened up.

In this manner, customized and/or personalized splash screen with desired contents can be displayed (e.g., appeared) on a client of a user. The splash screen with desired contents can match the personality traits and/or situations of the user. Product experience of the users can be enhanced.

What is claimed is:

1. A method for pushing a splash screen, comprising:
  receiving, by a server, identification information sent from a client, wherein the identification information comprises user identification, a globally unique identifier (GUID) of the client, or a combination thereof;
  obtaining, by the server, feature information correlated with the identification information from a preset database; and
  configuring, by the server, a splash screen according to the feature information and sending the splash screen to the client, wherein the splash screen is displayed on a screen of the client next time when the client is opened up;
  wherein the feature information correlated with the identification information is obtained according to at least one of personal information of a user, virtual community attribute data of the user, network browsing activities of the user, and user preferences; and
  wherein configuring, by the server, a splash screen according to the feature information and sending the splash screen to the client further comprises:
    categorizing, by the server, users into at least two user groups based on a feature value from feature information of the plurality of users, each user group including a plurality of users, wherein users in a same user group have the same feature value;
    assigning, by the server, splash screens to the at least two user groups, wherein each user group is assigned with a customized splash screen correlated with the same feature value shared by the users in the user group;
    determining, by the server, a specific user group that the client belongs to, according to the feature information correlated with the identification information; and
    sending, by the server, the customized splash screen assigned to the specific user group to the client.

2. The method of claim 1, wherein the identification information comprises the user identification of a user; and before the receiving of the identification information sent from the client, the method further comprises:
  obtaining, by the server, network behavior data of the user;
  extracting, by the server, the feature information of the user from the network behavior data; and
  correlating, by the server, the feature information with the user identification of the user and storing the feature information in the preset database.

3. The method of claim 1, wherein the identification information comprises a login mode of the user, and wherein the configuring of the splash screen according to the feature information comprises:
  configuring, by the server, a first splash screen according to the feature information when the login mode is a first mode; and
  configuring, by the server, a second splash screen according to the feature information when the login mode is a second mode.

4. The method of claim 1, wherein the identification information comprises the GUID of the client, and wherein, before the receiving of the identification information sent from the client, the method further comprises:
  obtaining, by the server, user behavior data of the client;
  extracting, by the server, the feature information from the user behavior data; and
  correlating, by the server, the feature information with the GUID of the client and storing the feature information in the preset database.

5. A server comprising:
  a first receiving module, configured to receive identification information sent from a client, wherein the identification information comprises user identification, a GUID of the client, or a combination thereof;
  a first obtaining module, configured to obtain feature information correlated with the identification information from a preset database; and
  a configuring module, configured to configure a splash screen according to the feature information and to send the splash screen to the client, wherein the splash screen is displayed on a screen of the client next time when the client is opened up;
  wherein the feature information correlated with the identification information is obtained according to at least one of personal information of a user, virtual community attribute data of the user, network browsing activities of the user, and user preferences; and
  wherein the configuring mode is further configured to:
    categorize a plurality of users into at least two user groups based on a feature value from feature information of the plurality of users, each user group including a plurality of users, wherein users in a same user group have the same feature value;
    assign splash screens to the at least two user groups, wherein each user group is assigned with a customized splash screen correlated with the same feature value shared by the users in the user group;

determine a specific user group that the client belongs to, according to the feature information correlated with the identification information; and send the customized splash screen assigned to the specific user group to the client.

6. The server of claim 5, wherein the identification information comprises the user identification of a user, and the server further comprises:

a second obtaining module, configured to obtain network behavior data of the user;

a first extracting module, configured to extract the feature information of the user from the network behavior data; and a first storing module, configured to correlate the feature information with the user identification of the user and to store the feature information in the preset database.

7. The server of claim 5, wherein the identification information comprises a login mode of the user, and wherein the configuring module is used to:

configure a first splash screen according to the feature information when the login mode is a first mode; and configure a second splash screen according to the feature information when the login mode is a second mode.

8. The server of claim 5, wherein the identification information comprises the GUID of the client, and the server further comprises:

a third obtaining module, configured to obtain user behavior data of the client;

a second extracting module, configured to extract the feature information from the user behavior data; and a second storing module, configured to correlate the feature information with the GUID of the client terminal and to store the feature information in the preset database.

9. A client comprising:

a sending module, configured to send identification information to a server, wherein the identification information comprises user identification or a GUID of the client, or a combination thereof, and wherein the identification information is used by the server to obtain feature information correlated with the identification information from a preset database;

a second receiving module, configured to receive a splash screen configured by the server according to the feature information; and a displaying module, configured to display the splash screen next time when the client is opened up;

wherein the feature information correlated with the identification information is obtained according to at least one of personal information of a user, virtual community attribute data of the user, network browsing activities of the user, and user preferences; and wherein the server is configured to:

categorize a plurality of users into at least two user groups based on a feature value from feature information of the plurality of users, each user group including a plurality of users, wherein users in a same user group have the same feature value;

assign splash screens to the at least two user groups, wherein each user group is assigned with a customized splash screen correlated with the same feature value shared by the users in the user group;

determine a specific user group that the client belongs to, according to the feature information correlated with the identification information; and send the customized splash screen assigned to the specific user group to the second receiving module.

10. The client of claim 9, wherein the identification information comprises the user identification of a user, and wherein the device further comprises:

a fourth obtaining module, configured to obtain login information of the user, wherein the login information comprises the user identification.

11. The client of claim 10, wherein the identification information further comprises a login mode of the user.

12. The method of claim 2, wherein extracting, by the server, the feature information of the user from the network behavior data further comprises:

analyzing, by the server, the obtained network behavior data of a plurality of users by at least one of an intelligent mining analysis and a statistical analysis.

13. The method of claim 3, wherein:

the client is a browser;

the first login mode is a direct login via an account center of the browser; and the second login mode is a login on a service page when the user browses the service page via the browser.

14. The method of claim 1, wherein:

the customized splash screen contains greetings specifically addressed to the users sharing the same feature value in the use group.

15. The method of claim 1, wherein:

the customized splash screen contains an advertisement specifically addressed to the users having the same feature value in the use group.

16. The method of claim 2, wherein:

the client is a browser; and the server obtains the network behavior data of the user according to relevant registration information of the user and browsing behavior of the user via the browser.

* * * * *